United States Patent [19]

Zappa

[11] 4,328,443

[45] May 4, 1982

[54] APPARATUS FOR PROVIDING IMPROVED CHARACTERISTICS OF A BROAD AREA ELECTRON BEAM

[75] Inventor: Oswald L. Zappa, Stoneham, Mass.

[73] Assignee: Avco Everett Research Laboratory, Inc., Everett, Mass.

[21] Appl. No.: 129,469

[22] Filed: Mar. 11, 1980

[51] Int. Cl.$^3$ .......................... H01J 33/02; H01S 3/09

[52] U.S. Cl. .......................................... 313/420; 372/74

[58] Field of Search .................. 331/94.5 PE, 94.5 G; 313/231.4, 231.6, 420

[56] References Cited

U.S. PATENT DOCUMENTS 3,702,973 11/1972 Daugherty et al. .......... 331/94.5 PE 3,921,098 11/1975 Hoag .............................. 331/94.5 G 4,061,944 12/1977 Gay ..................................... 313/420

*Primary Examiner*—James W. Davie

*Attorney, Agent, or Firm*—M. E. Frederick

[57] ABSTRACT

An electron beam device having a vacuum chamber in which an electron beam generator generates a directed stream of electrons. An electron beam window comprising a foil which seals the vacuum chamber is in the path of the stream of electrons and permits passage of the stream of electrons into a working region exterior of the chamber and adjacent the electron beam window. An electrode is positioned closely adjacent the foil and a second electrode is spaced from the foil to form an elongated working or, in the case of a laser, a lasing region between them. The electrodes are maintained at a high electrical potential which, along with the electron beam, molecularly excites a gaseous working medium between the electrodes. The included angle of electrons passing through and scattered by the foil is limited and the electron beam confined to a desired region by an external shield or bezel overlying the foil. The bezel is provided with a series of openings which may be in the form of holes or slots of predetermined depth, size and spacing one from another to provide the electrons emerging from the foil with a desired included angle of emergence while maintaining losses at a minimum.

11 Claims, 4 Drawing Figures

APPARATUS FOR PROVIDING IMPROVED CHARACTERISTICS OF A BROAD AREA ELECTRON BEAM

BACKGROUND OF THE INVENTION

This invention relates to electron discharge devices and, in particular, to electron discharge devices having an improved structure for irradiating exterior of the device a volume having a substantial cross section and providing a discharge therein.

In recent years electron beam generating devices have been used to produce molecular excitation of a gaseous working medium. This molecular excitation is useful in producing a lasing action within an optical cavity. In addition, it may be used with advantage to provide the desired electrical conductivity of a gaseous working medium in a magnetohydrodynamic device such as a generator and accelerator. It also may be used with other devices that require or use electrically conductive or ionized gases.

An excellent example of one of the above-noted types of apparatus may be found in U.S. Pat. No. 3,702,973 entitled "Laser Ozone Generator in Which a Broad Electron Beam with a Sustainer Field Produce a Large Area, Uniform Discharge" in the name of Jack D. Daugherty et al, of common assignment with the present invention and incorporated herein by reference as if set out at length.

The Daugherty et al patent describes an electron beam generator which in one form may be briefly described for purposes of the present invention as a vacuum chamber in which a high voltage electrode accelerates a directed stream of electrons toward and through an electron beam window such as electron beam window 47 shown and described in the Daugherty et al patent. A foil or electron beam window 47 in the chamber wall provides a physical barrier to maintain the vacuum in the chamber, but is essentially transparent to the passage of electrons to permit the stream of electrons to pass from the vacuum chamber. An electrode such as electrode 52 is positioned closely adjacent the foil outside the chamber and another electrode is spaced from the first electrode to form a lasing cavity outside the vacuum chamber that may be at about one-tenth of an atmosphere to atmospheric pressure and above. A high voltage potential is applied across the electrodes 50 and 52 as shown and described, for example, in the Daugherty et al. patent and this potential, in cooperation with the electron beam, produces a discharge which molecularly excites a working gas typically flowing between the electrodes to produce in a laser a population inversion and production of a laser beam.

I have found that in prior art devices, the precluding factor for attaining electron beam uniformity is foil scattering of the emerging electrons and that this scattering is substantially independent of the accelerating voltage. I have further found that the electron beam profile across the working or interaction region is virtually independent of the electron beam generator characteristics except very near the foil. Components projecting into gas flowing through the reaction region causes turbulence which, in the case of lasers, degrades the optical quality of the laser beam.

The scattering in prior art devices of electrons by the foil results in the deposition of substantial amounts of energy in the gas in portions of the working region that are of little, if any, value.

SUMMARY OF THE INVENTION

The invention is an improvement on devices of the above general type not limited solely to laser apparatus, but also to apparatus for producing chemical reactions in gases, ionizing a gas and/or a controlled discharge in a gas to molecularly excite a working gas medium which incorporates a shield or bezel overlying the foil for limiting the included angle of electrons passing through and scattered by the foil to confine the electrons within a desired region. The bezel is provided with a series of holes or slots of predetermined depth, size and spacing one from another to provide the electrons emerging from the foil with a desired included angle of emergence while maintaining losses at a minimum.

DESCRIPTION OF THE INVENTION

The above and other related features of the present invention will be apparent from a reading of the following description of the disclosure shown in the accompanying drawings and the novelty thereof pointed out in the appended claims.

Figure 1:
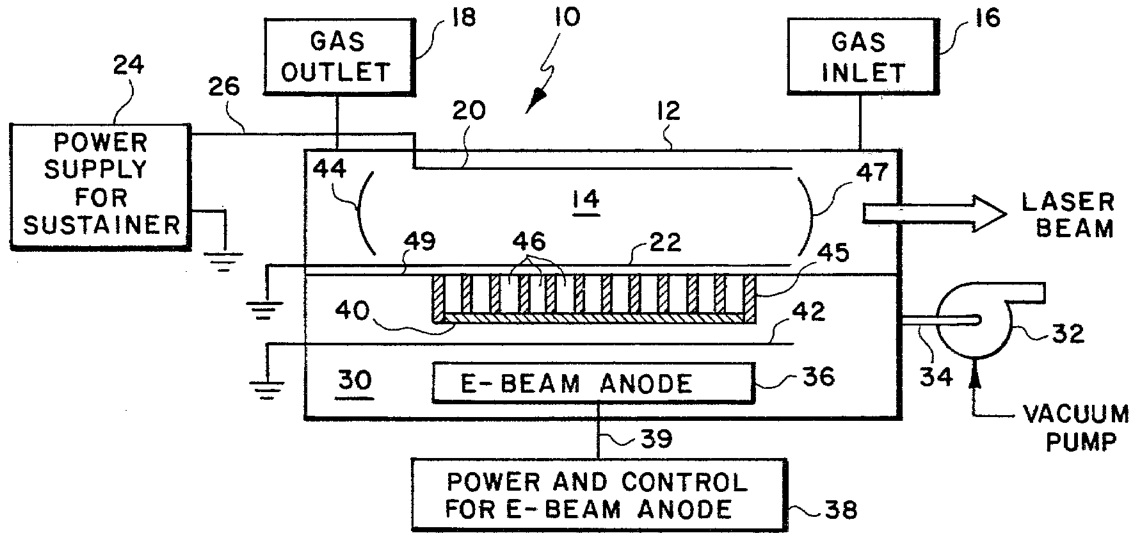
FIG. 1 is a schematic illustration of a laser embodying the present invention.

Referring to FIG. 1, there is shown schematically an electron beam-sustainer laser indicated by reference character 10. While the invention will be described in connection with this laser, it should be noted that it is equally applicable to other electron beam-sustainer devices as discussed above. The laser 10 as shown only by way of example comprises an outer housing 12 having a lasing region 14. Housing 12 is supplied with gas from a gas inlet 16 which passes through lasing region 14 to a gas outlet 18. While FIG. 1 suggests that gas flow is from right to left, in point of fact, it is to be noted that flow is preferably in the direction normal to the plane of the paper. This gas forms a lasing medium for the laser beam and may be comprised of gaseous mixtures of carbon dioxide, nitrogen and helium, as well as other lasing gases or mixtures thereof. An elongated electrode 20 is provided along one side of the housing 12 and an elongated electrode 22 (suitably grounded) is provided opposite electrode 20 to define the lasing region 14 between them. The electrode 20 is supplied with a substantial electrical potential from a suitably grounded power supply 24 via line 26. The gas in the lasing region 14 is molecularly excited by preferably a broad area directed stream of electrons from an electron beam assembly disposed in chamber 30. Chamber 30 is maintained at a very low pressure by a vacuum pump 32 connected to a suitable conduit 34 leading from the chamber 30. An elongated high voltage electron beam generator anode 36 is positioned within the chamber 30 and supplied with electrical potential by suitably grounded power and control system 38 via line 39. The electron beam generator electrode 36 may be maintained at a high voltage so that it accelerates a directed stream of electrons towards a suitably grounded electrode 42. Cathode 42 may be formed from a screenlike material so that a substantial portion of the electrons which have been directed at it pass through it. The directed stream of electrons also pass through a foil 40 mounted in their path. The foil 40 which functions as an electron beam window is formed from material that physically seals chamber 30, but which permits the passage of the directed stream of electrons with minimum attenuation. Many different materials can be used for this, such as aluminum, titanium, etc.

The foil 40 sealably covers an aperture in chamber 30 and is most conveniently supported on a reticulated metal plate (not shown) in electrical connection with the housing 12. Foil 40 completely covers the aperture in chamber 30 and extends on each side thereof a sufficient distance to be removably and sealably secured to the wall of chamber 30 by a suitable window retaining ring or the like. For a more detailed description of a suitable prior art electron beam window structure, reference is made to U.S. Pat. No. 4,061,944 of common assignment with the present invention and incorporated herein by reference as if set out at length.

As more fully discussed in connection with FIG. 2, disposed over and covering foil 40 is a shield or bezel 45 provided with a series of slots 46 of predetermined depth, size and spacing to provide electrons passing through foil 40 with the desired included angle. Bezel 45 is preferably flush with the wall 49 in which it is mounted to keep turbulence at this point at a minimum.

When the laser 10 is to be operated, the gaseous working medium is passed through the lasing region 14 and the power supply 24 and the power and control system 38 supply electrical energy to the electrodes in the lasing region and to the electron beam generator anode, respectively. For operation in the multi-pulse mode, the power supply 24 may provide a pulsed potential across the electrodes 20 and 22 and the power and control system 38 for the electron beam generator anode 36 may produce a series of pulses coincident with the sustainer pulses across electrodes 20 and 22.

When the power supply 38 is energized, a combination of the action of the electrodes 20 and 22 and the directed stream of electrons which traverses the working or lasing region causes an inversion in the gas within the lasing region 14 to produce lasing action. Mirrors 44 and 47 at opposite ends of electrodes 20 and 22 form a regenerative optical laser cavity between them so that a coherent laser beam is generated within the lasing region 14. Laser mirror 47 may be partially transmissive so that a portion of the beam which strikes it passes out of the housing in the form of a directed laser beam. Alternately, as is well-known in the art, the mirrors 44 and 47 may be omitted and an appropriate laser beam passed through the laser cavity if the laser is to operate as an amplifier.

Figure 2:
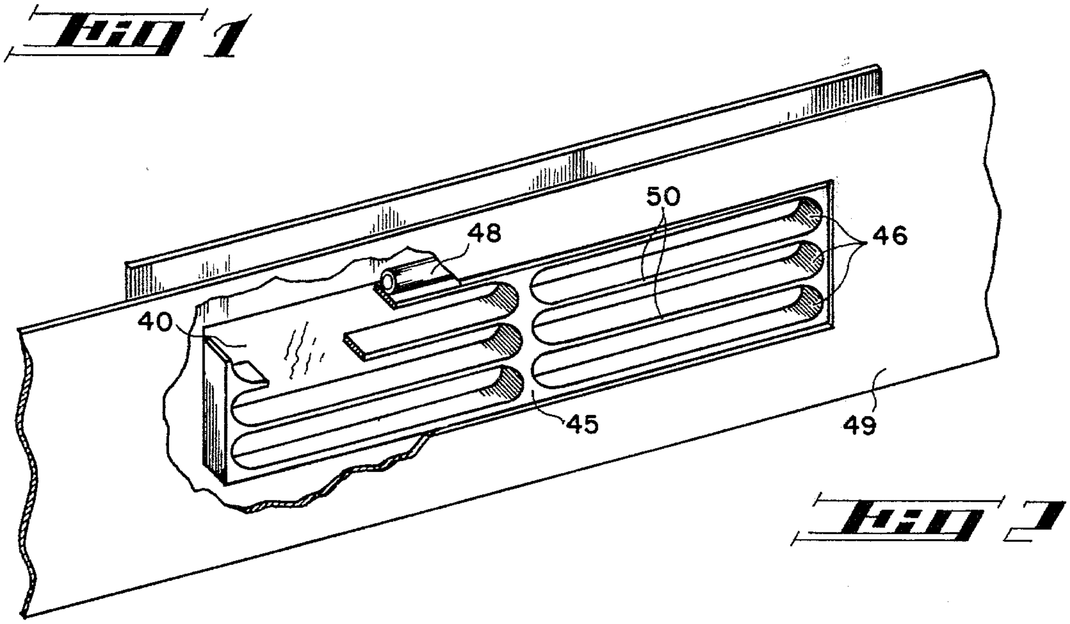
FIG. 2 is a perspective view with parts broken away of an electron beam window shield in accordance with the invention.
Figure 4:
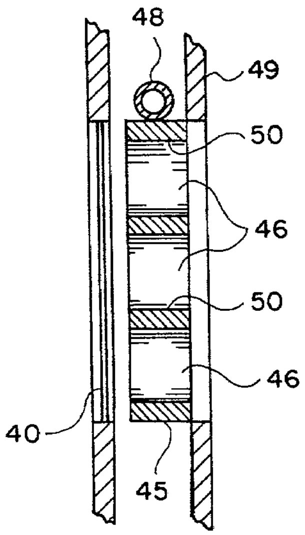

Directing attention now to FIG. 2, one form of the shield 45 which has been operated successfully is shown in rectangular form with slots 46 extending in the length direction. The slots comprise the majority of the cross sectional area of shield 45. While shield 45 is shown in FIG. 2 as being disposed in contact with and covering foil 40, it is to be understood that, as shown in FIG. 4, shield 45 may be spaced from foil 40. Spacing shield 45 from foil 40 while reducing heat transfer from foil 40 to shield 45, has the advantage of reducing the aspect ratio of the slots or opening and this will reduce electron beam losses in the shield.

Broadly, determination of dimensions of the slots or openings is based on the field of view or volume desired to be irradiated. After determination of the desired field of view, the dimension of the slots or openings and webs 50 are determined in conventional manner, preferably selecting dimensions that limit irradiation by the electron beam to the desired and most effective volume while keeping losses in the shield to a minimum. Where substantial output powers are involved, coolant passages (not shown) may be provided in the shield and/or conduits 48 provided for a coolant.

For the conventional application where a broad area rectangular electron beam is provided, slots 46 as shown in FIG. 2 are most convenient since electron scatter in the length direction is of little, if any, concern except at the extreme ends of the working or lasing region. Thus, where working regions other than those of rectangular cross section are used, the openings in the shield need not be rectangular in shape and may take any other desired form, shape or orientation.

The present invention is of greatest value for those devices wherein the electron beam energy is of a value that scattering occurs as electrons emerge from foil 40. At sufficiently high electron beam energies, electrons will emerge from the foil and travel in more or less straight lines thereby obviating the need of a shield. However, in many applications, such high electron beam energies are either unnecessary or undesirable.

Figure 3:
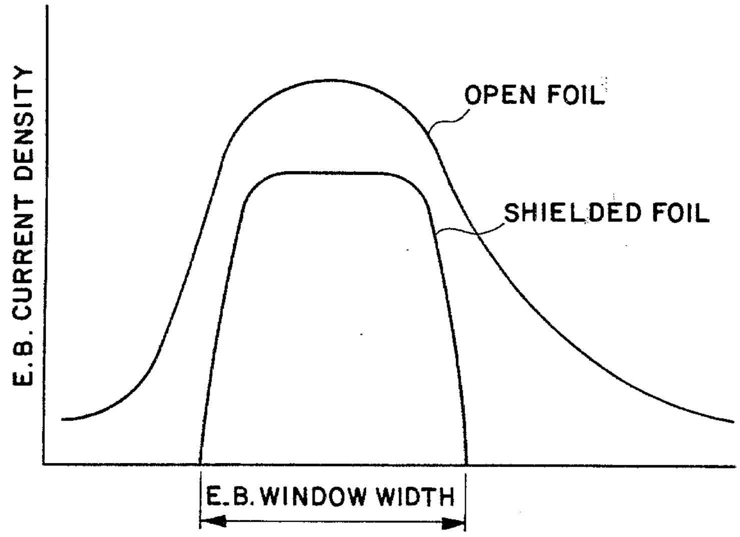
FIG. 3 is a graph illustrating electron current density in the working region where a prior art electron beam window is used and electron beam density for an electron beam window in accordance with the invention and FIG. 4 is an end view of an electron beam window shield spaced from the electron beam window.

FIG. 3 illustrates the improvement that may be obtained with a shield in accordance with the invention. The outer curve shows by way of example electron beam current density in a typical working region for an open foil whereas the inner curve shows the considerably restricted current density restricted essentially to the effective working region of a shielded foil in accordance with the invention. In electron beam-sustainer devices of the type here concerned, the majority of electrical power is deposited in the working gas from the sustainer circuit which includes electrodes 20 and 22 of FIG. 1. This power is deposited in the working gas substantially only where the electron beam exists. From the above and from FIG. 3, it may now be clearly seen that the reduction in power loss in those regions upstream and downstream of the effective lasing region (the regions between the sides of the two curves of FIG. 3 that do not effectively contribute to efficient operation) far exceed any small increase in electron beam power that may be required to make up for losses in the shield.

Directing attention now back to FIG. 2, the shield 45 is preferably recessed in the channel wall 49 so that its outer surface is flush with the exposed surface of the channel wall 49. Further, the shield 45 preferably functions as the anode in the sustainer circuit (electrode 22 of FIG. 1). Utilization of shield 45 to define a sustainer circuit electrode flush with the chamber wall in addition to desirably restricting the electron beam, obviates the necessity of prior art electrodes disposed in the gas flow as shown and described, for example, in U.S. Pat. No. 3,860,887 to Hoag et al which is incorporated herein as if set out at length. Provision of electrode 20 of FIG. 1 as a flat metal plate flush with the wall in combination with the provision of electrode 22 as disclosed herein not only improves the electron beam distribution and decreases electrical power losses, but, by decreasing turbulence in the lasing region, improves the optical qualities of the laser beam.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In an electron beam-sustainer device having means including two oppositely disposed walls defining a working region therebetween and through which a working gas is passed; means for generating and introducing into said working region a broad area stream of electrons through a thin foil disposed in one of said walls; and means including two electrodes spaced one from another for providing an electrical field across said working region traversed by said stream of electrons, the improvement comprising:

an electrically conductive shield member having a plurality of web portions spaced one from another to at least substantially define a plurality of openings, said shield member being disposed over said foil whereby said electron stream must pass through said foil and then through said openings to enter said working region, said web portions having a depth, size and spacing one from another whereby said shield member permits said stream of electrons passing through its said openings to traverse substantially only a predetermined volume in said working region.

2. Apparatus as defined in claim 1 wherein said shield member is in contact with said foil.

3. Apparatus as defined in claim 1 wherein said shield member is spaced from said foil.

4. Apparatus as defined in claim 2 wherein said foil and shield member are recessed in said one of said walls and the exposed surface of said shield member is at least substantially flush therewith.

5. Apparatus as defined in claim 3 wherein said foil and shield member are recessed in said one of said walls and the exposed surface of said shield member is at least substantially flush therewith.

6. Apparatus as defined in claim 4 wherein said shield member comprises one of said electrodes.

7. Apparatus as defined in claim 6 wherein the other of said electrodes is at least substantially flush with the surface of said other wall.

8. Apparatus as defined in claim 5 wherein said shield member comprises one of said electrodes.

9. Apparatus as defined in claim 8 wherein the other of said electrodes is at least substantially flush with the surface of said other wall.

10. Apparatus as defined in claim 7 wherein said other of said electrodes is a substantially flat metal plate.

11. Apparatus as defined in claim 9 wherein said other of said electrodes is a substantially flat metal plate.

* * * * *

UNITED STATES PATENT AND TRADEMARK OFFICE

CERTIFICATE OF CORRECTION

PATENT NO. : 4,328,443

DATED : May 4, 1982

INVENTOR(S) : O. L. Zappa

It is certified that error appears in the above-identified patent and that said Letters Patent are hereby corrected as shown below:

Column 1, line 43, delete "52" and insert therefor--50--; and Column 1, line 45, after "trode" and before "is", insert--such as electrode 52--.

Signed and Sealed this

*Twenty-second* Day of *June 1982*

[SEAL]

*Attest:*

GERALD J. MOSSINGHOFF

*Attesting Officer* *Commissioner of Patents and Trademarks*